(12) United States Patent
You et al.

(10) Patent No.: US 9,190,788 B2
(45) Date of Patent: *Nov. 17, 2015

(54) DUAL MEMORY CARD SOCKET

(71) Applicant: Molex, LLC, Lisle, IL (US)

(72) Inventors: In-Ho You, Ansan (KR); In-Chull Yang, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,033

(22) Filed: Apr. 30, 2013

(65) Prior Publication Data

US 2013/0288535 A1    Oct. 31, 2013

(30) Foreign Application Priority Data

Apr. 30, 2012 (KR) .................. 10-2012-0045143

(51) Int. Cl.
| | |
|---|---|
| *H01R 24/00* | (2011.01) |
| *H01R 24/62* | (2011.01) |
| *G06K 7/00* | (2006.01) |
| *H01R 13/24* | (2006.01) |
| *H01R 27/02* | (2006.01) |

(52) U.S. Cl.
CPC .............. *H01R 24/62* (2013.01); *G06K 7/0073* (2013.01); *H01R 13/2442* (2013.01); *H01R 27/02* (2013.01)

(58) Field of Classification Search
CPC .................................................. G06K 7/0021
USPC ............................................. 439/630, 541.5
See application file for complete search history.

(56) References Cited

U.S. PATENT DOCUMENTS

| | | | | |
|---|---|---|---|---|
| 6,071,136 | A * | 6/2000 | Bricaud et al. | 439/188 |
| 6,130,387 | A * | 10/2000 | Bricaud et al. | 439/188 |
| 6,206,710 | B1* | 3/2001 | Chen | 439/159 |
| 6,431,893 | B1* | 8/2002 | Chang et al. | 439/188 |
| 7,351,109 | B2 | 4/2008 | Wang | |
| 7,409,225 | B2 | 8/2008 | Kim et al. | |
| 7,771,231 | B2* | 8/2010 | Kim | 439/541.5 |
| 7,896,671 | B2* | 3/2011 | Kim et al. | 439/188 |
| 2002/0052147 | A1* | 5/2002 | Sato | 439/630 |
| 2004/0023538 | A1* | 2/2004 | Masson et al. | 439/188 |
| 2004/0209506 | A1* | 10/2004 | Kawahata et al. | 439/188 |

FOREIGN PATENT DOCUMENTS

| | | |
|---|---|---|
| CN | 2826738 Y | 10/2006 |
| CN | 201327889 Y | 10/2009 |
| CN | 201638977 U | 11/2010 |
| JP | 2003-132977 A | 5/2003 |
| JP | 2003-317892 A | 11/2003 |
| JP | 2006-324043 A | 11/2006 |
| JP | 2008-204847 A | 9/2008 |
| KR | 1003207 | 12/2009 |
| TW | M25083 U | 12/2004 |
| TW | M310469 U | 4/2007 |

* cited by examiner

*Primary Examiner* — Tho D Ta

(57) ABSTRACT

The Present Disclosure relates to mold a micro SIM card connecting terminal and a micro SD card connecting terminal by means of an integrated terminal mold, so as to significantly reduce the whole length of the dual memory card socket and manufacturing method thereof. The Present Disclosure is formed by a structure manufactured by molding the micro SIM card connecting terminal and the micro SD card connecting terminal by means of an integrated terminal mold, and then separating them by a cutting process.

13 Claims, 9 Drawing Sheets

DUAL MEMORY CARD SOCKET

REFERENCE To RELATED APPLICATIONS

The Present Disclosure claims priority to prior-filed Korean Patent Application No. 10-2012-0045143, entitled "Dual Memory Card Socket And Manufacturing Method Thereof," filed on 20 Apr. 2012 with the Korean Intellectual Property Office. The content of the aforementioned Patent Application is incorporated in its entirety herein.

BACKGROUND OF THE PRESENT DISCLOSURE

The Present Disclosure relates, generally, to a dual memory card socket, and, more particularly, to a micro SIM card connecting terminal and a micro SD card connecting terminal integrated by means of a terminal mold, significantly reducing the length of the card socket.

Conventional mobile communication terminals are separately provided with memory cards capable of authenticating personal information and credit settlements, as well as memory cards for storing data upon usage of multiple kinds of contents. Among these memory cards are SIM cards, R-UIM cards, moneta cards, bank cards, etc., as well as cards for storing data of multiple kinds of contents, including micro SD cards, smart media cards, XD picture cards, t-flash cards, etc.

In order to reduce the risk of loss of conventional memory cards, a SIM card—for authenticating personal information and credit settlements—is mounted on a backside shell immediately close to the battery pack. It is thus impossible to replace the memory card in a state where the battery pack is not detached from the mobile communication terminal. Memory cards for storing data are mounted on the side of the mobile communication terminal in such a way that it can be replaced immediately.

In both memory cards used for authenticating and memory cards used for data, connection sockets should be made into separate sockets, should be mounted on corresponding positions of the mobile communication terminals, and require mounting spaces for individually mounting. Thus, it is difficult to make the mobile communication terminals thinned and miniature, so that provision of parts for adding new functions is limited.

In order to solve the aforementioned problems, dual-memory-card-type sockets have been developed which simultaneously fix and accommodate memory cards for authenticating and memory cards for data in one memory socket. As an example, U.S. Pat. No. 7,409,225 discloses a dual connecting device for connecting storing media and a mobile communication terminal provided with such device. Additionally, Korean Patent No. 1003207 discloses a dual-memory-card-type socket for a mobile communication terminal. The contents of both the '225 and '207 Patents are incorporated herein in their entireties.

Such conventional sockets are capable of simultaneously connecting a micro SIM card and a micro SD card. Such sockets typically include a casing, with receiving spaces on the upper and bottom sides. These receiving spaces are used for receiving a micro SIM card from the front side to the rear side, whereas an SD card is received in the right direction for the insertion direction of the SIM card. Upper and bottom covers, made of metal and respectively used for covering the receiving spaces, are also included. As is a SIM card connecting end, provided within the upper receiving space for connecting with the SIM card. Also included is an SD card connecting end located between the bottom receiving spaces, inserted from the left side of the insertion direction of the micro SIM card to connect to the SD card. Finally, included is a locking device, constituted of a heart-shaped cam, a coil spring and a pin rod, used for fixing the micro SD card.

Thus, the micro SD card is inserted from a vertical right direction of the insertion direction of the micro SIM card. A heart-shaped cam includes a body forming a guide stretch and a securing portion. The guide stretch is constituted of first to fourth regions, for the movement of a pin rod, as well as an upper boundary end and a bottom boundary end for dividing the regions. The left face of the upper boundary end protrudes leftwards from the bottom boundary end. The bottom boundary protrudes rightwards. The third and fourth regions constitute one plane, forming a triangular inclined face therebetween, to prevent failure of the cam.

However, in conventional dual-memory-card-type sockets, insertion directions of the micro SIM card and the micro SD card are formed into 90°. Accordingly, insertion and ejection of the cards need additional outer space. When designing the cell phones, space usage is limited. The micro SIM card connecting terminal and the micro SD card connecting terminal are arranged overlapping each other, so that reducing the whole height of the socket is technically limited. Accordingly, in a turn-on state of the power of the cell phone (with the battery mounted), when the micro SIM card is arbitrarily ejected, errors of operation system of the cell phone may occur.

Further, conventional sockets are formed by separately manufacturing the micro SIM card connecting terminal and the micro SD card connecting terminal, and then assembling them or by twice molding of individual molds. Therefore, manufacturing cost is increased. Further, a welded part of the sockets micro SD card connecting terminal is straightly formed in the insertion direction of the SD card. Thus, it is limited in term of reducing the whole length.

SUMMARY OF THE PRESENT DISCLOSURE

Accordingly, one object of the Present Disclosure is to solve the aforementioned problems. When mounting and detaching (combining/separating) are processed within the inner space of the socket, usage capacity of the space is maximized. During detachment of the micro SD card, picking-out will go through a short path. Thus, mounting and detaching can be realized with minimal space. The micro SIM card connecting terminal and the micro SD card connecting terminal do not overlap, so that the whole height of the socket can be reduced. In turn-on state of the power of the mobile communication terminal (with the battery mounted), the micro SIM card cannot be arbitrarily detached. Thus, there is provided a dual memory card socket which will not cause errors of operating of the mobile communication terminal.

Another object of the Present Disclosure is to provide a dual memory card socket which molds the micro SIM card connecting terminal and the micro SD card connecting terminal with an integrated terminal mold, cut into separate structures by means of cutting process. Therefore, compared with a conventional configuration of separately manufacturing the micro SIM card connecting terminal and the micro SD card connecting terminal and then assembling or twice molding, reducing the whole length can be achieved.

In order to achieve the aforementioned objects, the dual memory card socket of the Present Disclosure comprises a casing, provided with a formed opening for a micro SIM card. The opening is provided with a micro SIM card connecting terminal mounting part on one side, and a micro SD card connecting terminal mounting part on the other side. Additionally, multiple micro SIM cards connecting terminals, combined with the micro SIM card connecting terminal mounting part, contact the micro SIM card connecting end on one side, and are fixed to a printed circuit board on the other side. Further, multiple micro SD cards connecting terminals, combined with the micro SD card connecting terminal mounting part, contact the micro SD card connecting end on one side, and are fixed to the printed circuit board on the other side. Additionally, multiple micro SD cards connecting terminals, combined with the micro SD card connecting terminal mounting part, contact a connecting end of the micro SD card on one side, and are fixed to the printed circuit board on the other side. Further, a micro SIM card casing, mounted on the upper portion of the casing, is formed with an inserting space for inserting the micro SIM card into the inner space of the casing, and a guiding slice for guiding the micro SD card on both sides on the top. Additionally, a micro SD card casing, located at a relative higher position with respect to the micro SIM card casing, is mounted on the rear end of the casing, formed with an inserting space in inner space for inserting the micro SD card, and with an opening in the front so that the micro SD card be inserted and ejected into the inserting space. Further, the upper position and bottom position of the inserting spaces of the micro SIM card and the micro SD card, the micro SIM card and the micro SD card are all structures operating along a same direction. Finally, the micro SIM card connecting terminal and the micro SD card connecting terminal are molded by means of an integrated terminal mold (M) and may be separated by means of a cut-in process.

In order to sense the entry and exit of the micro SIM card and the micro SD card, a detecting switch wiring end is arranged at the rear end of the casing. The detecting switch wiring end may mold together the micro SIM card connecting terminal and the micro SD card connecting terminal by means of an integrated terminal mold, but also may separately manufacture them and then assemble them. Welded parts of the micro SD card connecting terminal are located at both sides of the micro SIM card connecting terminal. A contacting part of the detecting switch wiring end bends, and, with respect to the proceeding direction of the micro SD card, is in the same column as the micro SD card connecting terminal. Upon entry of the micro SD card, contacting parts of the micro SD card connecting terminal and the detecting switch wiring end sequentially contact the connecting end of the micro SD card. An anti-droop plat is formed on the rear end of the casing for preventing the micro SD card from drooping.

As described above, the Present Disclosure is formed by a structure manufactured by molding the micro SIM card connecting terminal and the micro SD card connecting terminal by means of an integrated terminal mold, and then separating them by a cutting process. Compared with conventional configurations of first individually manufacturing micro SIM card connecting terminals and micro SD card connecting terminals, and then molding mounting by inserts, the manufacturing cost is significantly reduced and the whole length is significantly reduced.

Further, in the Present Disclosure, the welded parts of the detecting switch wiring end are positioned at both sides of the micro SIM card connecting terminal. Compared with conventional configuration, where the welded part is straightly formed according to the insertion direction of the micro SD card, in the Present Disclosure, the whole length is significantly reduced, and effect of significantly shortening detecting (checking) process is achieved.

Further, in the Present Disclosure, the detecting switch wiring end and the micro SD card connecting terminal are in the same column in the proceeding direction of the micro SD card. When the micro SD card is inserted, the micro SD card connecting terminal and the contacting part of the detecting switch wiring end sequentially contact the connecting end (contacting pad) of the micro SD card. Thus, the connecting end (contacting pad) of the micro SD card can be used to detect, and the contacting part can be used to make contact. Accordingly, reducing the number of elements of the detecting switch wiring end and accurately sensing whether or not the micro SD card is inserted are achieved.

Additionally, in the Present Disclosure, above the rear part of the casing, an anti-droop plat for preventing the micro SD card from excessively drooping downwards is formed, effectively preventing the micro SD card connecting terminal and the contacting part of the detecting switch wiring end from deforming. Additionally, when mounting and detaching (combining/separating) are processed within the inner space of the socket in the Present Disclosure, usage capacity of the space is maximized. During detachment of the micro SD card, picking-out will go through a short path. Thus, mounting and detaching can be realized with a minimal space. The micro SIM card connecting terminal and the micro SD card connecting terminal do not overlap, so that the height of the socket can be reduced. In turn-on state of the power of the mobile communication terminal (with the battery mounted), the micro SIM card cannot be arbitrarily detached. Thus, it will not cause errors of operating system of the mobile communication terminal.

Finally, the contacting part of the micro SD card connecting terminal of the Present Disclosure is formed as a two-segment bending structure. Compared with the conventional micro SD card connecting terminal structures, the whole length can be significantly reduced. An advantage of the durability of a contacting part that does not deform is achieved, so that contact pressure is increased and thus the contact reliability of the contact is improved.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
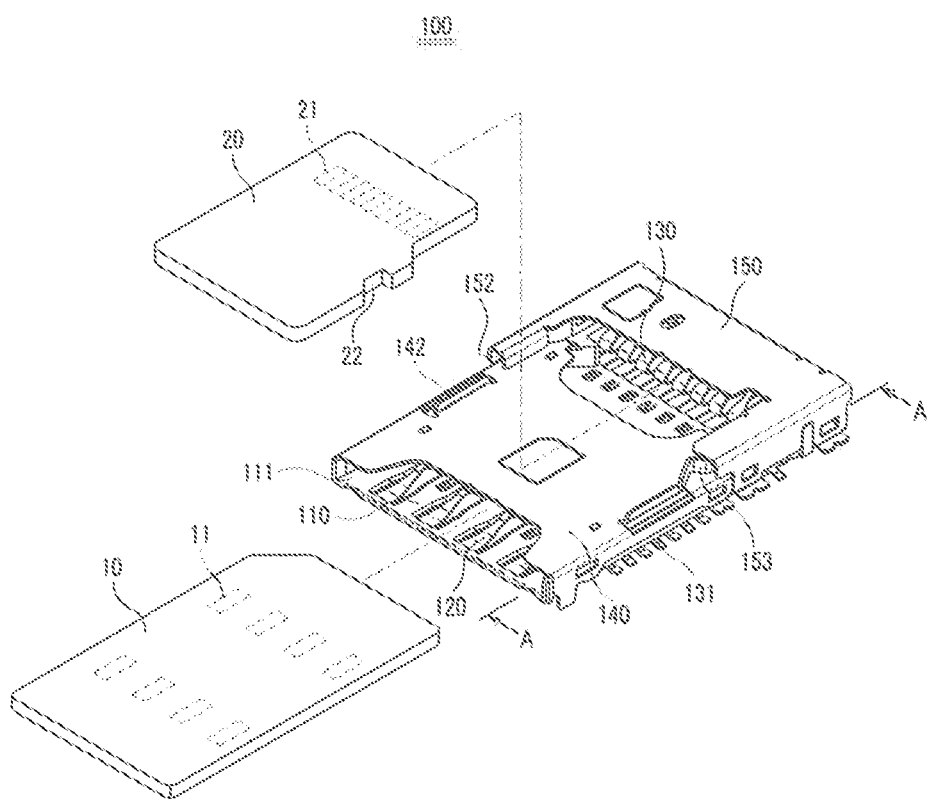
FIG. 1 is a combination schematic diagram of a dual memory card socket according to an embodiment of the Present Disclosure.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to the Figures, a dual memory card socket 100 according to a preferred embodiment of the Present Disclosure is explained by an example of push-pull style combination of a micro SIM card and a micro SD card. The dual memory card socket 100 includes a casing 110 provided in the front with formed opening 111 so that micro SIM card 10 goes out and comes in inwardly, and is provided with a micro SIM card connecting terminal mounting part 112 on one side, and with a micro SD card connecting terminal mounting part 113 on the other side.

The micro SIM card connecting terminal mounting part 112 includes multiple micro SIM card connecting terminals 120. Each micro SIM card connecting terminal 120 contacts a connecting end 11 of the micro SIM card 10 on one side, and is fixed to a printed circuit board (not illustrated) on the other side. The micro SD card connecting terminal mounting part 113 includes multiple micro SD cards connecting terminals 130. The micro SD card connecting terminal 130 contacts a connecting end 21 of the micro SD card 20 on one side, and is fixed to the printed circuit board (not illustrated) on the other side. Thus, a contacting part 132 of the micro SD card connecting terminal 130 is connected to the connecting end 21 in a form of two segments of bending structures. Further, a welded part 131 of the micro SD card connecting terminal 130 is welded fixed to the printed circuit board (not illustrated).

An upper portion of the casing 110 is capable of mounting the micro SIM card casing 140. The micro SIM card casing 140 is formed for inserting an inserting space 141 of the micro SIM card 10 into the inner space of the casing 110. Both sides of the upper portion of the micro SIM card casing 140 is formed with guiding slices 142 for guiding the micro SD card 20. Located at a relative higher position with respect to the micro SIM card casing 140, the rear end of the casing 110 is capable of mounting the micro SD card casing 150. The inner space of the micro SD card casing 150 is formed with an inserting space 151 for inserting the micro SD card 20. An opening 152 is form in the front so that the micro SD card 20 goes out and comes in towards the inserting space 151. A lock 153 is formed by the side of the micro SD card casing 150.

The micro SD card 20 is inserted into the inserting space 151, and then the lock 153 will be elastically inserted into a lock groove 22 of the micro SD card 20, to lock the micro SD card 20 to prevent arbitrary detachment. Both side faces of the casing 110 are formed with a combination prominence 110a for mounting the micro SIM card casing 140 and the micro SD card casing 150. Both side faces of the micro SIM card casing 140 and the micro SD card casing 150 are formed with positioning piece N. Further, the upper and bottom positions of the inserting spaces 141, 151 of the micro SIM card 10 and the micro SD card 20, the micro SIM card 10 and the micro SD card 20 are configured into a structure which goes out and comes in along same direction (one direction).

The micro SIM card connecting terminal 120 and the micro SD card connecting terminal 130 are pressed into film by means of an integrated terminal mold (M), and are separated by means of cutting process. Compared with a conventional configuration of separately manufacturing the micro SIM card connecting terminal and the micro SD card connecting terminal, reducing the whole length can be achieved. Additionally, a detecting switch wiring end 160 is arranged at the rear end of the casing 110, so as to sense the entry and leaving of the micro SIM card 10 and the micro SD card 20.

Figure 19:
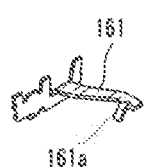
FIG. 19 is a schematic diagram of bending-type detecting switch wiring end according to an embodiment of the Present Disclosure.
Figure 20:
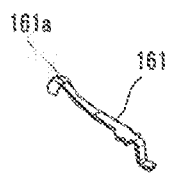
FIG. 20 is a schematic diagram of domed-type detecting switch wiring end according to an embodiment of the Present Disclosure.

A contacting part 160a of the detecting switch wiring end 160 may be configured as the bending type shown in FIG. 19, or the domed type shown in FIG. 20.

The proceeding direction of the contacting part 160a of the detecting switch wiring end 160 towards the micro SD card 20 is in the same column as the micro SD card connecting terminal 130. When inserting the micro SD card 20, contacting parts 160a of the micro SD card connecting terminal 130 and the detecting switch wiring end 160 sequentially contact connecting ends 21 of the micro SD card 20.

The detecting switch wiring end 160 can also be configured as a separate structure formed by molding the micro SIM card connecting terminal 120 and the micro SD card connecting terminal 130 by means of an integrated terminal mold M, and then cut by cutting process.

Here, so called integrated terminal mold M means that the micro SIM card connecting terminal 120 and the micro SD card connecting terminal 130 are terminal structure formed by integrated be molded into films or by injection molding; or the micro SIM card connecting terminal 120, the micro SD card connecting terminal 130 and the detecting switch wiring end 160 are terminal structure formed by processes such as being integrated molded into films.

Figure 18:
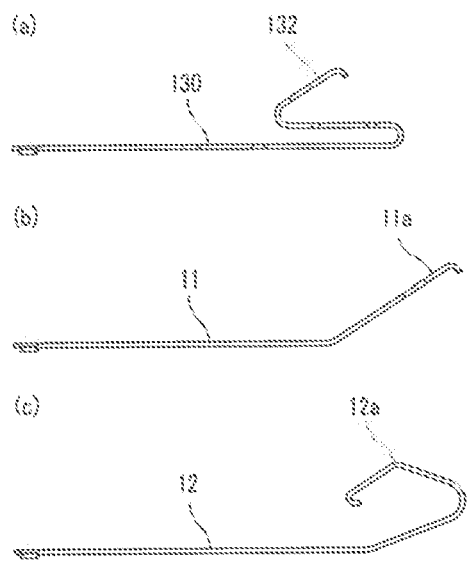
FIGS. 18(a)(b)(c) are comparing explanatory drawings of a bending structure of a contacting part of the micro SD card terminal and a bending structure of a contacting part of the conventional micro SD card terminal.

As shown in FIG. 18(a), a contacting part 132 of the micro SD card connecting terminal 130 are formed as two-segment bending structure. As shown in FIG. 18(b), a contacting part 12 of the conventional micro SD card connecting terminal 11 is of a one-segment bending structure. As shown in FIG. 18(c), a contacting part 12 of the conventional micro SD card connecting terminal 11 can significantly shorten the whole length, as compared with two-segment reverse bending structure. Additionally, advantage of durability of the contacting part 132 that won't make plastic deformation in case of being used in a long time is achieved, so that contact pressure is increased and thus the contact reliability of the contact is improved.

The welded parts 131 of the micro SD card connecting terminal 130 are located on both sides of the micro SIM card connecting terminal 120, and compared with conventional structure that the welded part and the insertion direction of micro SD card are straightly formed, the whole length can significantly reduced, and detecting process can shortened.

Thus, by detecting by means of using the connecting end (contacting pad) 21 of the micro SD card, and by contacting by means of the contacting part 160a, effects of reducing number of elements of the detecting switch wiring end 160 and accurately sensing whether or not the micro SD card is inserted are achieved.

Above the rear part of the casing 110, an anti-droop plat 115 for preventing the micro SD card 20 from drooping downwards is formed.

The anti-droop plat 115 prevents the micro SD card 20 from being over pressed downwards, and functions to prevent the micro SD card connecting terminal 130 and the contacting part 160a of the detecting switch wiring end 160 from deforming.

Functions of the dual memory card socket constituting an embodiment of the Present Disclosure as described above will be explained in the following.

The micro SIM card 10 is inserted into the inserting space 141 through the opening of the micro SIM card casing 140.

The guiding slice 142 functions to guide the micro SD card 20. The connecting end 11 of the micro SIM card 10 is electrically connected to the micro SIM card connecting terminal 120.

The micro SD card 20 is inserted into the inserting space 151 of the micro SD card casing 150. The connecting end 21 of the micro SD card 20 is electrically connected to the micro SD card connecting terminal 130.

In the meantime, The proceeding direction of the contacting part 160a of the detecting switch wiring end 160 towards the micro SD card 20 is in the column as the micro SD card connecting terminal 130. When inserting the micro SD card 20, contacting parts 160a of the micro SD card connecting terminal 130 and the detecting switch wiring end 160 sequentially contact connecting ends 21 of the micro SD card 20.

Detecting by means of the connecting end (contacting pad) 21 of the micro SD card 20, and contacting by means of the contacting part 160a, can accurately sensing whether or not the micro SD card is inserted.

The lock 153 of the micro SD card casing 150 is elastically inserted into the lock groove 22 of the micro SD card 20, preventing the micro SD card 20 from arbitrarily separating.

Above the rear part of the casing 110, an anti-droop plat 115 for preventing the micro SD card 20 from excessively drooping downwards is formed, so as to prevent the micro SD card connecting terminal 130 and the contacting part 160a of the detecting switch wiring end 160 from deforming.

Figure 2:
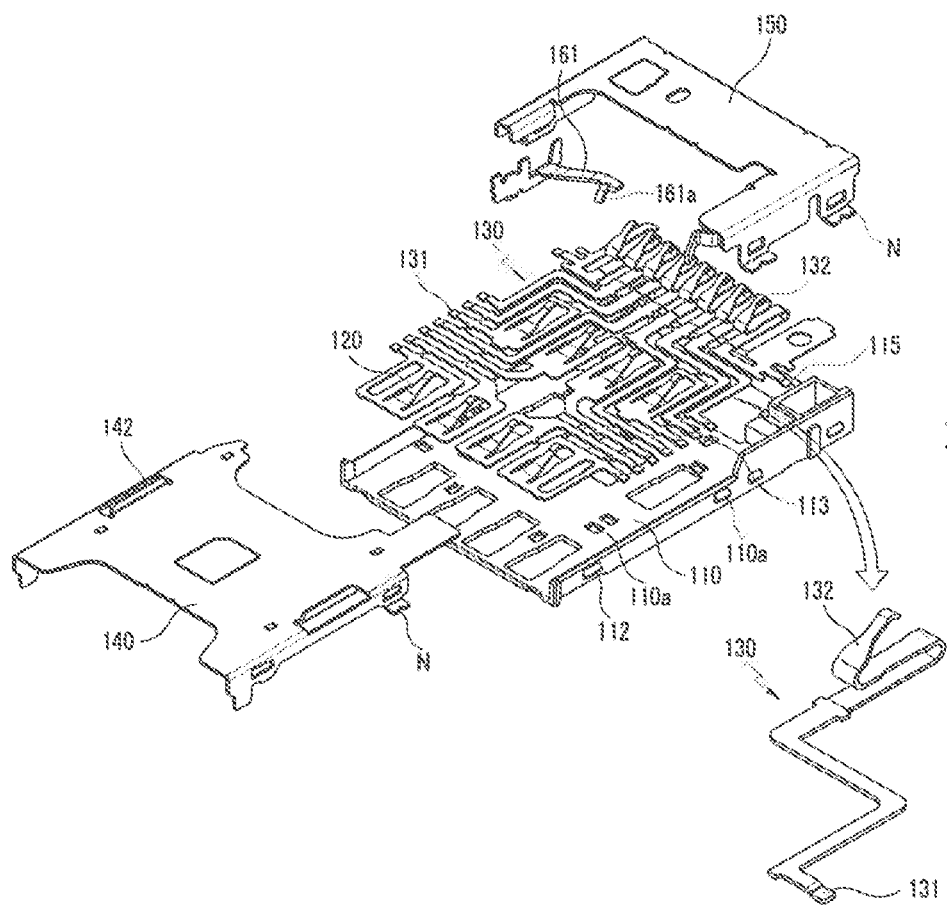
FIG. 2 is a separate schematic diagram of the dual memory card socket of FIG. 1.
Figure 3:
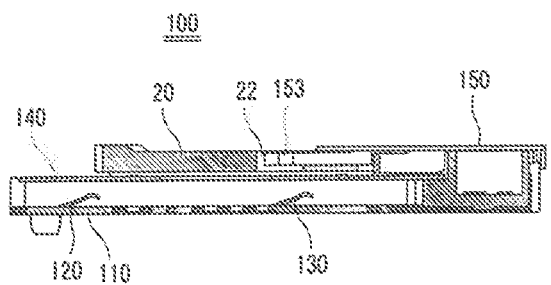
FIG. 3 is a longitudinal sectional view along Line A-A of FIG. 1.
Figure 4:
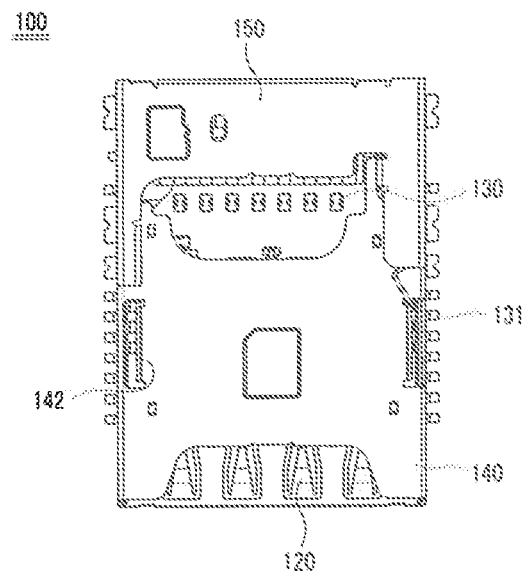
FIG. 4 is a plan view of FIG. 1.
Figure 5:
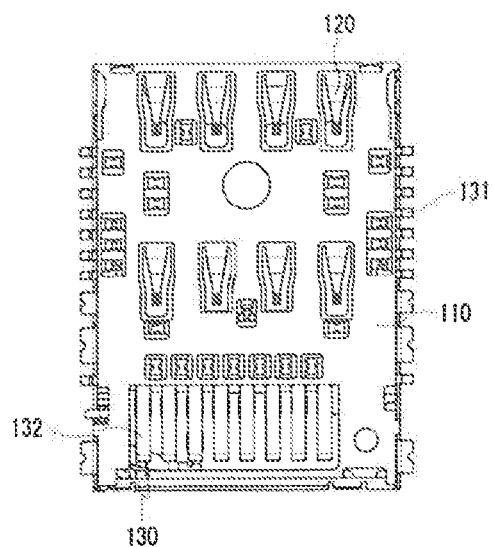
FIG. 5 is a bottom view of FIG. 1.
Figure 6:
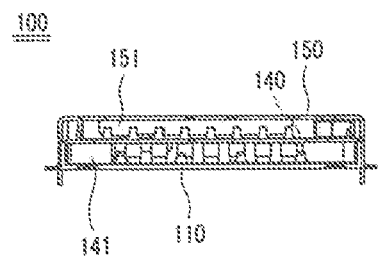
FIG. 6 is a front view of FIG. 1.
Figure 7:
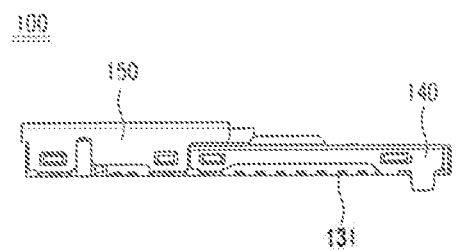
FIG. 7 is a left view of FIG. 1.
Figure 8:
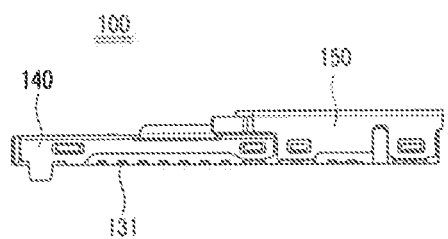
FIG. 8 is a right view of FIG. 1.
Figure 9:
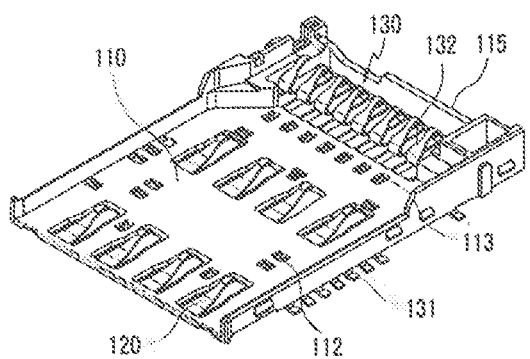
FIG. 9 is a schematic diagram of a casing according to an embodiment of the Present Disclosure.
Figure 10:
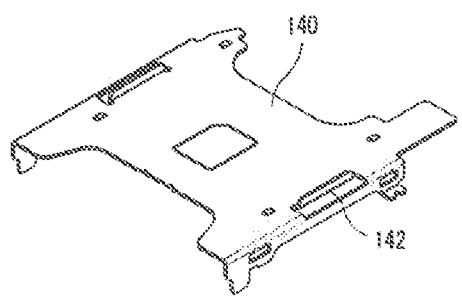
FIG. 10 is a schematic diagram of a micro SIM card casing according to an embodiment of the Present Disclosure.
Figure 11:
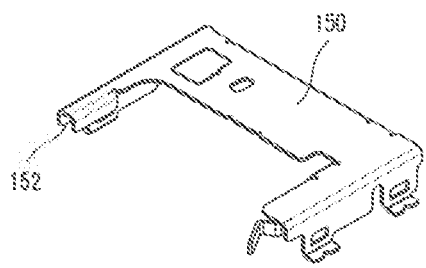
FIG. 11 is a schematic diagram of a micro SD card casing according to an embodiment of the Present Disclosure.
Figure 12:
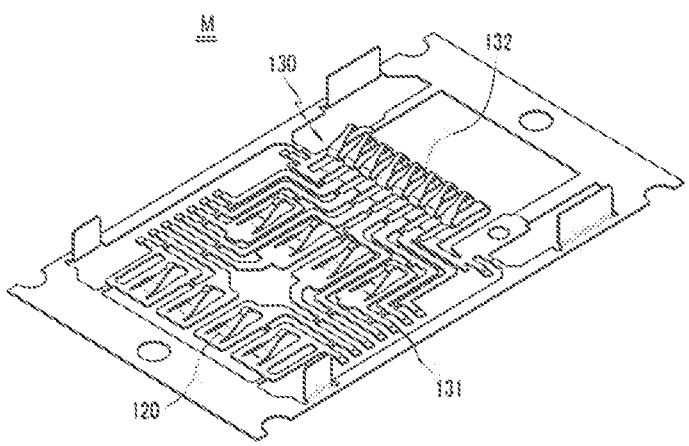
FIG. 12 is a schematic diagram of an integrated terminal mold according to an embodiment of the Present Disclosure.
Figure 13:
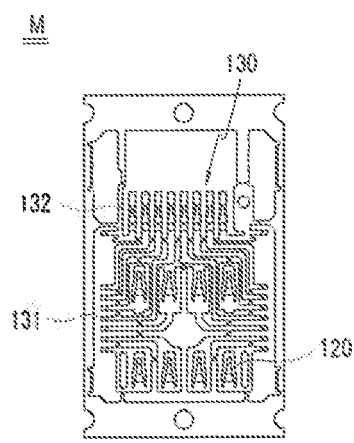
FIG. 13 is a plan view of FIG. 12.
Figure 14:
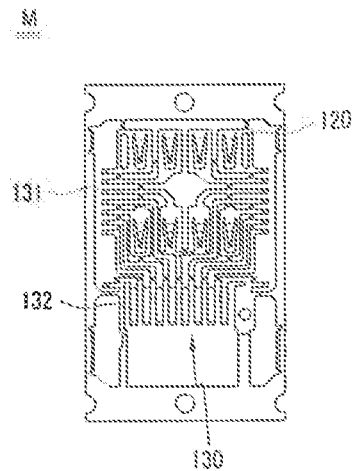
FIG. 14 is a bottom view of FIG. 12.
Figure 15:
FIG. 15 is a front view of FIG. 12.
Figure 16:
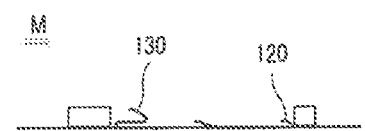
FIG. 16 is a left view of FIG. 12.
Figure 17:
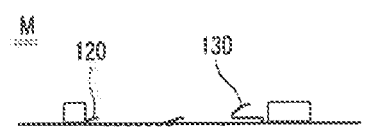
FIG. 17 is a right view of FIG. 12.
Figure 21:
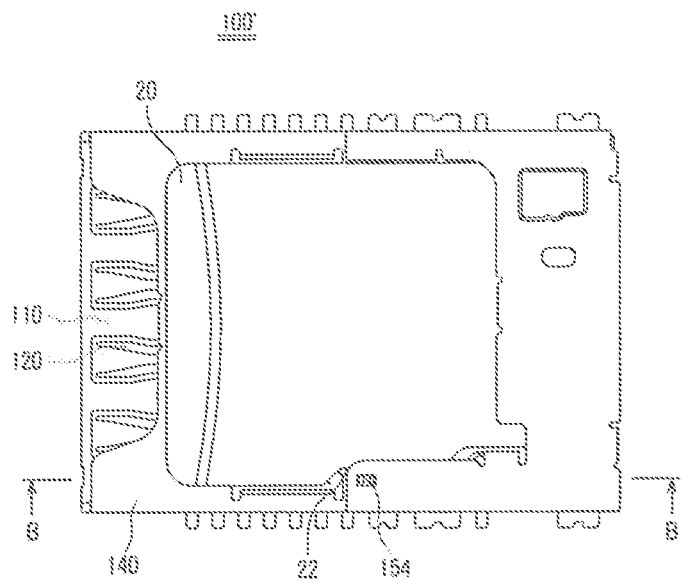
FIG. 21 is a plan view of a dual memory card socket according to an embodiment of the Present Disclosure.
Figure 22:
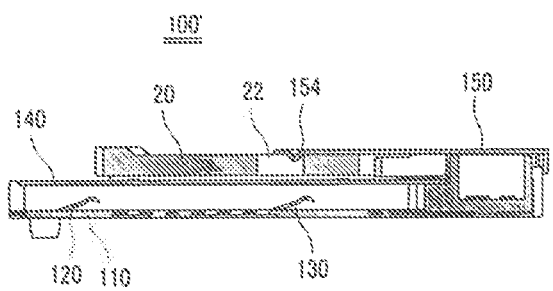
FIG. 22 is a longitudinal sectional view along Line B-B of FIG. 21.
Figure 23:
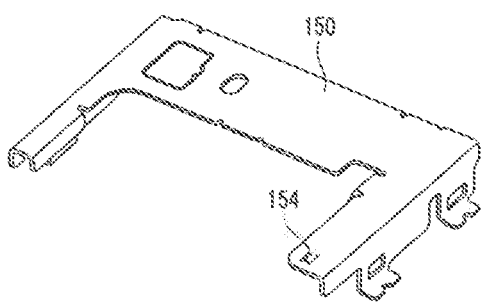
FIG. 23 is a schematic diagram of a micro SD card casing according to another embodiment of the Present Disclosure.

Referring to FIGS. 21-2, a dual memory card socket 100' according to another embodiment of the Present Disclosure inserts the micro SD card 20 into inserting space 151. The contacting pad 21 of the micro SD card 20 is elastically contacted with the rear end of micro SD card connecting terminal 130; in the meantime, the top face of the micro SD card casing 150 is cut so as to form tensioning piece 154, so that the micro SD card 20 is subject to an upward force, preventing detaching backwards (pushing away).

The tensioning piece 154 is elastically inserted into a lock groove 22 of the micro SD card casing 150, preventing the micro SD card 20 from backwardly pushing away or detaching.

Figure 24:
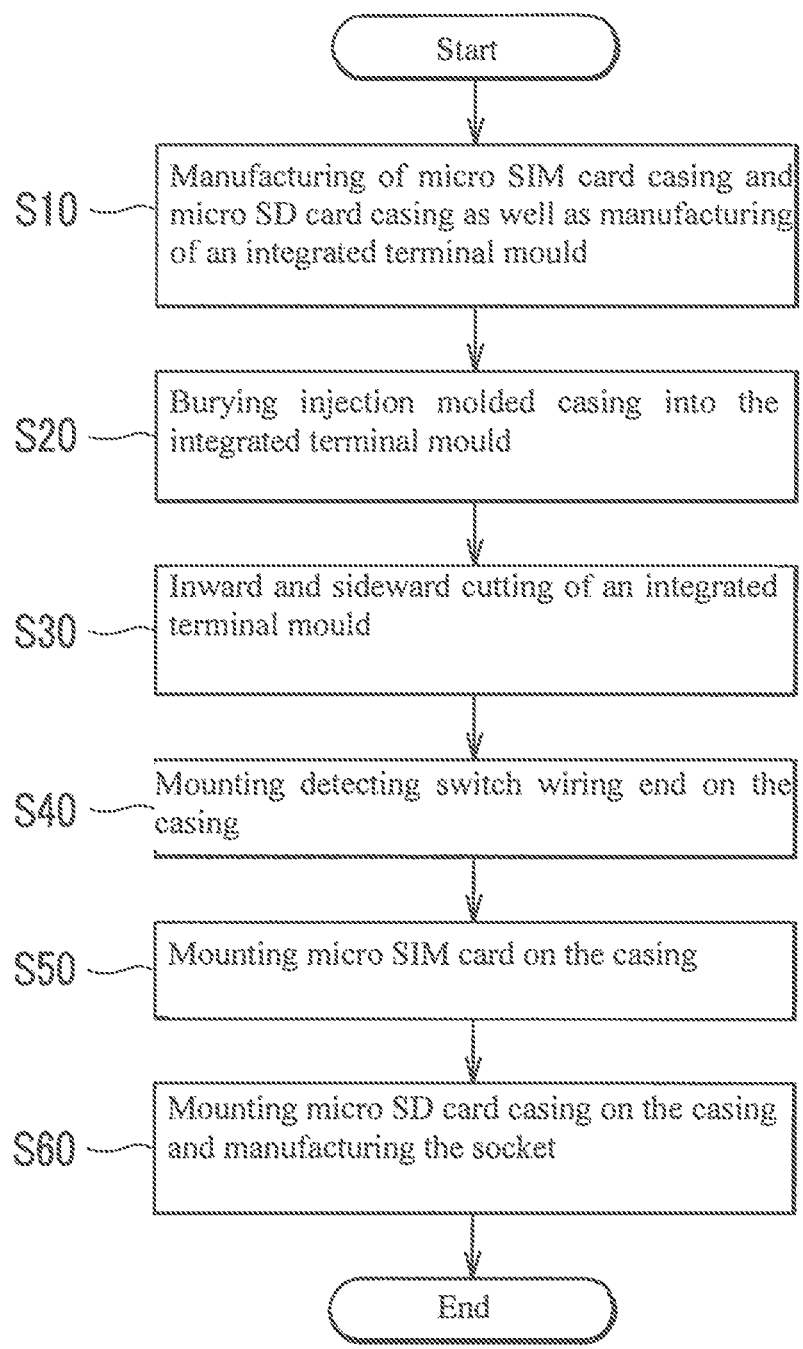
FIG. 24 is a block view for explaining a dual memory card socket manufacturing method of the Present Disclosure.

Referring to FIG. 24, a dual memory card socket manufacturing method according to a preferred embodiment of the Present Disclosure comprises: stage S10 of manufacturing a micro SIM card casing 140 and a micro SD card casing 150, and manufacturing an integrated terminal mold M integrated formed by a micro SIM card connecting terminal 120 and a micro SD card connecting terminal 130; stage S20 of burying an injection molded casing 110 into the integrated terminal mold M; stage S30 of inward cutting the integrated terminal mold M, separating the micro SIM card connecting terminal 120 and the micro SD card connecting terminal 130; stage S40 of mounting a detecting switch wiring end 160 on the casing 110; stage S50 of mounting a micro SIM card casing 140 on the casing 110; and stage S60 of mounting a micro SD card casing 150 on the casing 110, so as to finish socket manufacturing.

In the manufacturing stage S10 of the micro SIM card casing 140 and the micro SD card casing 150, manufacturing the micro SIM card casing 140, both sides of the upper portion of which is formed with guiding slices 142 for guiding the micro SD card 20, and manufacturing the micro SD card casing 150 in front of which an opening 152 is formed for the micro SD card 20 to go out and come in.

In the stage S20 of burying an injection molded casing 110 into the integrated terminal mold M, manufacturing the casing 110 which is provided in the front with formed opening 111 so that the micro SIM card 10 goes out and comes in inwardly, is provided with a micro SIM card connecting terminal mounting part 112 on one side, and is provided with a micro SD card connecting terminal mounting part 113 on the other side.

The welded part 131 of the micro SD card connecting terminal 130 is manufactured as be located by the side of the micro SIM card connecting terminal 120.

As described above, the Present Disclosure is formed by a structure manufactured by molding the micro SIM card connecting terminal and the micro SD card connecting terminal by means of an integrated terminal mold, and then separating them by a cutting process. Compared with conventional configuration of first individually manufacturing micro SIM card connecting terminal and micro SD card connecting terminal, and then molding mounting by inserts, reducing the whole length can be achieved.

Further, in the Present Disclosure, the welded parts of the detecting switch wiring end are positioned at both sides of the micro SIM card connecting terminal; compared with conventional configuration of welded part is straightly formed according to the insertion direction of the micro SD card, the whole length is significantly reduced, and effect of significantly shortening detecting (checking) process is achieved.

Further, in the Present Disclosure, as for the proceeding direction of the micro SD card, the detecting switch wiring end and the micro SD card connecting terminal are in the same column. When the micro SD card is inserted, the micro SD card connecting terminal and the contacting part of the detecting switch wiring end sequentially contact the connecting end (contacting pad) of the micro SD card. Thus, the connecting end (contacting pad) of the micro SD card can be used to detect, and the contacting part 160a can be used to make contact, thus effects of reducing number of elements of the detecting switch wiring end and accurately sensing whether or not the micro SD card is inserted are achieved.

Additionally, in the Present Disclosure, above the rear part of the casing, an anti-droop plat for preventing the micro SD card from excessively drooping downwards is formed, so as to effectively prevent the micro SD card connecting terminal and the contacting part of the detecting switch wiring end from deforming.

Additionally, the contacting part of the micro SD card connecting terminal of the Present Disclosure is formed as a two-segments bending structure. Compared with the conventional micro SD card connecting terminal structure, the whole length can be significantly reduced. Advantage of durability of the contacting part that won't make plastic deformation in case of being used in a long time is achieved, so that contact pressure is increased and thus the contact reliability of the contact is improved.

While a preferred embodiment of the Present Disclosure is shown and described, it is envisioned that those skilled in the art may devise various modifications without departing from the spirit and scope of the foregoing Description and the appended Claims.

What is claimed is:

1. A dual memory card socket, the dual memory card socket comprising:
    a casing, the casing including a micro SIM card connecting terminal mounting part on one side and a micro SD card connecting terminal mounting part on another side;
    a plurality of micro SIM card connecting terminals, each micro SIM card connecting terminal being combined with the micro SIM card connecting terminal mounting part, in contact with the micro SIM card connecting end on one side and fixed to a printed circuit board on another side;
    a plurality of micro SD card connecting terminals, each micro SD card connecting terminal being combined with the micro SD card connecting terminal mounting part, in contact with the micro SD card connecting end on one side and fixed to the printed circuit board on another side;
    a micro SIM card casing, the micro SIM card casing being mounted on an upper portion of the casing, and formed with an inserting space for inserting a micro SIM card into the casing and a guiding slice for guiding a micro SD card on both sides on a top of the casing; and
    a micro SD card casing, the micro SD card casing being located at a position higher than the micro SIM card casing, mounted on a rear end of the casing, and formed with an inserting space, for inserting the micro SD card, and an opening in the front;
    wherein the micro SIM card connecting terminals and the micro SD card connecting terminals are integrally molded.

2. The dual memory card socket of claim 1, wherein upper and bottom positions of the inserting spaces, the micro SIM card and the micro SD card are structures all operating along a same direction on one side.

3. The dual memory card socket of claim 2, wherein, upon insertion of the micro SD card, the contacting parts of the micro SD card connecting terminal and the detecting switch wiring end sequentially contact the connecting end of the micro SD card.

4. The dual memory card socket of claim 2, wherein an anti-droop plat is formed on the rear end of the casing.

5. The dual memory card socket of claim 2, wherein a tensioning piece elastically inserted into a lock groove of the micro SD card casing is formed by cutting the top of the micro SD card casing.

6. The dual memory card socket of claim 2, wherein the contacting part of the micro SD card connecting terminal is a two-segment bending structure.

7. The dual memory card socket of claim 2, wherein a detecting switch wiring end is arranged at the rear end of the casing to sense the micro SIM card and the micro SD card, the detecting switch wiring end being formed by molding the micro SIM card connecting terminal and the micro SD card connecting terminal by means of an integrated terminal, and then separating by means of cut-in process.

8. The dual memory card socket of claim 7, wherein a contacting part of the detecting switch wiring end bends is in the same column as the micro SD card connecting terminal with respect to the proceeding direction of the micro SD card.

9. The dual memory card socket of claim 2, wherein welded parts of the micro SD card connecting terminal are located on a side of the micro SIM card connecting terminal.

10. The dual memory card socket of claim 9, wherein the welded parts are located at both sides of the micro SIM card connecting terminal.

11. A dual memory card socket, the dual memory card socket comprising:
    a casing;
    a micro SIM card connecting terminal combined with the casing;
    a micro SD card connecting terminal combined with the casing;
    a micro SIM card casing mounted on top of the casing and forming an inserting space for inserting the micro SIM card into the casing; and
    a micro SD card casing located at a position higher than the micro SIM card casing, the micro SD card casing being mounted on a rear end of the casing;
    wherein the micro SIM card connecting terminal and the micro SD card connecting terminal are integrally molded.

12. The dual memory card socket of claim 11, wherein a detecting switch wiring end is provided at the rear end.

13. The dual memory card socket of claim 12, wherein the detecting switch wiring end and the integrated terminal mold are integrally molded.

* * * * *